(12) United States Patent
Fletcher (10) Patent No.: US 10,704,288 B2
(45) Date of Patent: Jul. 7, 2020

(54) TEMPORARY MAINTENANCE ENCLOSURES AND METHODS OF MAINTAINING TURBINE BLADES

(71) Applicant: VENTURA WIND ENERGY LIMITED, London (GB)

(72) Inventor: David Fletcher, Blonay (CH)

(73) Assignee: Ventura Wind Energy Limited, London (GB)

( * ) Notice: Subject to any disclaimer, the term of this patent is extended or adjusted under 35 U.S.C. 154(b) by 0 days.

(21) Appl. No.: 16/242,628

(22) Filed: Jan. 8, 2019

(65) Prior Publication Data

US 2019/0162172 A1    May 30, 2019

Related U.S. Application Data

(63) Continuation-in-part of application No. 15/302,931, filed as application No. PCT/GB2015/051003 on Mar. 31, 2015, now Pat. No. 10,352,062.

(30) Foreign Application Priority Data

Apr. 9, 2014    (GB) .................................. 1406379.6

(51) Int. Cl.
    *E04H 15/20*    (2006.01)
    *F03D 80/50*    (2016.01)
    (Continued)

(52) U.S. Cl.
    CPC .............. *E04H 15/20* (2013.01); *B23P 6/002* (2013.01); *F03D 80/50* (2016.05);
    (Continued)

(58) Field of Classification Search
    CPC ... E04H 15/26; E04H 15/20; E04H 2015/203; E04H 2015/204; B23P 6/002;
    (Continued)

(56) References Cited

U.S. PATENT DOCUMENTS 3,121,470 A * 2/1964 Stone .................... G09F 19/226
                                                        182/129
5,038,889 A * 8/1991 Jankowski ................ E04G 5/12
                                                        182/129

(Continued)

FOREIGN PATENT DOCUMENTS

DE        4336016       4/1995
DE       19909698       4/2000

(Continued)

OTHER PUBLICATIONS

102010011365; Koch et al.; Weather Protection Device for Platform; Dec. 23, 2019; EPO Machine Translation; pp. 1-5.*

(Continued)

*Primary Examiner* — Bayan Salone
(74) *Attorney, Agent, or Firm* — David B. Tingey; Bryant J. Keller; Kirton McConkie (57) ABSTRACT

A temporary maintenance enclosure for the maintenance of at least part of a turbine blade, the enclosure comprises a platform arranged, in use, to border at least part of the circumference of a blade in need of maintenance; at least one wall and a roof which are carried by the platform; the at least one wall extending from the platform; wherein said roof extends from the wall towards the blade; and wherein the enclosure further comprises a flexible sheath which seals onto the blade to provide a sealed volume for maintenance of said blade.

18 Claims, 5 Drawing Sheets

(51) Int. Cl.
  *F03D 80/00* (2016.01)
  *E04H 15/26* (2006.01)
  *B23P 6/00* (2006.01)

(52) U.S. Cl.
  CPC .. *E04H 2015/203* (2013.01); *E04H 2015/204* (2013.01); *F05B 2230/80* (2013.01); *Y02B 10/30* (2013.01); *Y02E 10/72* (2013.01); *Y02P 70/523* (2015.11); *Y10T 29/4932* (2015.01)

(58) Field of Classification Search
  CPC ...... F03D 80/00; F03D 80/50; F05B 2230/80; Y02E 10/72; Y02B 10/30; Y02P 70/523
  See application file for complete search history.

(56) References Cited

U.S. PATENT DOCUMENTS

| | | | | |
|---|---|---|---|---|
| 7,134,444 | B2* | 11/2006 | Mintie | B08B 15/00 |
| | | | | 135/131 |
| 8,397,382 | B2* | 3/2013 | Anasis | B23P 6/002 |
| | | | | 29/889.1 |
| 10,352,062 | B2* | 7/2019 | Fletcher | F03D 80/50 |
| 2006/0225960 | A1* | 10/2006 | Ferlin | E04G 1/15 |
| | | | | 182/138 |
| 2006/0291956 | A1* | 12/2006 | Chau | E04G 5/12 |
| | | | | 403/384 |
| 2011/0167633 | A1* | 7/2011 | Anasis | B23P 6/002 |
| | | | | 29/889.1 |
| 2016/0222692 | A1* | 8/2016 | Maillis | E04H 15/50 |

FOREIGN PATENT DOCUMENTS

| | | | | |
|---|---|---|---|---|
| DE | 10118906 | | 11/2002 | |
| DE | 10118906 A1 * | | 11/2002 | .............. B05D 7/00 |
| DE | 202004016460 | | 12/2004 | |
| DE | 202004016460 U1 * | | 1/2005 | .............. F03D 11/00 |
| DE | 202009002054 | | 6/2009 | |
| DE | 102010011365 A1 * | | 9/2011 | .............. E04G 5/12 |
| DE | 102010011365 | | 1/2016 | |
| NL | 1030193 | | 4/2007 | |
| WO | 9748863 | | 12/1997 | |
| WO | 2009121792 | | 10/2009 | |

OTHER PUBLICATIONS

10118906; Mueller, Holger; Coating Wind Power System Rotor Blades; Dec. 23, 2019; EPO Machine Translation; pp. 1-4.*

* cited by examiner

TEMPORARY MAINTENANCE ENCLOSURES AND METHODS OF MAINTAINING TURBINE BLADES

RELATED APPLICATIONS

This is a continuation-in-part of U.S. patent application Ser. No. 15/302,931, entitled "TEMPORARY MAINTENANCE ENCLOSURES AND METHODS OF MAINTAINING TURBINE BLADES", filed Oct. 7, 2016, which is a nationalization of PCT Application No. PCT/GB2015/051003, entitled "TEMPORARY MAINTENANCE ENCLOSURES AND METHODS OF MAINTAINING TURBINE BLADES", filed Mar. 31, 2015, which claims foreign priority to United Kingdom Patent Application No. 1406379.6, filed Apr. 9, 2014; the entire disclosures of each of the foregoing being hereby incorporated by reference herein.

FIELD OF THE INVENTION

The invention relates to temporary maintenance enclosures for the maintenance and repair of tall structures, and in particular for the maintenance of wind turbine blades.

BACKGROUND TO THE INVENTION

Swift deployment of equipment for the maintenance of wind turbines is ever more important as increasingly this renewal power source is relied upon by large populations.

Maintenance and repair of tall structures, such as wind turbines, is typically conducted using cranes, rigid suspension structures or by relying on pre-existing platforms for maintenance to be carried out. Another alternative is for individuals to scale these structures with the aid of harnesses and ropes to carry out maintenance and repair work without the use of heavy machinery or maintenance apparatus.

The following prior art documents are acknowledged: DE102010011365, DE202009002054, US2011/0167633, DE10118906 and DE19909698.

However, the use of cranes and rigid suspension structures is inefficient as this heavy machinery cannot be straightforwardly and quickly transported between structures in need of maintenance. The production and use of these machines is costly, and a further disadvantage is their own need for expensive and time consuming repair.

Reliance on pre-existing platforms carries the disadvantage that often these are not adjustable and therefore the work that can be carried out from the platform is limited. They are also costly to produce and therefore an alternative which can be cost effectively and speedily deployed is required.

The amount of maintenance work is also limited where individuals use harnesses to scale these large structures. As well as the obvious safety considerations, it is also an inefficient exercise as it takes engineers a considerable time to move around a structure and often they will not be able to take all the required equipment in a single trip.

A further disadvantage with current apparatus is that poor weather conditions can limit the extent to which work can be carried out on a turbine. Heavy wind, cold temperatures, adverse humidity and/or rain can prevent the deployment of these apparatus as, without adequate protection, the repair equipment and section of the turbine to be maintained could be compromised. Maintenance work of a wind turbine blade is also problematic where the ambient temperature of the blade is too low.

The object of the invention is to therefore alleviate at least these problems.

SUMMARY OF THE INVENTION

In a first broad independent aspect, the invention provides a temporary maintenance enclosure for the maintenance of at least part of a turbine blade, said enclosure comprising a platform arranged, in use, to border at least part of the circumference of a blade in need of maintenance; at least one wall and a roof which together are carried by said platform; said at least one wall extending from said platform; wherein said roof extends from said wall towards said blade; and wherein said enclosure further comprises a flexible sheath which seals onto said blade to provide a sealed volume for maintenance of said blade.

This configuration provides the advantage of an enclosure where maintenance of a turbine blade can be carried out in poor weather conditions. This improves the safety of maintenance operations and allows time and cost efficient maintenance of a large number of turbine blades.

The enclosure may be at least partially inflatable. The roof may be inflatable. The wall may be collapsible. This configuration provides the advantage of a maintenance structure, which is quick and straightforward to deploy. This way, maintenance/repair work can be swiftly carried out. This configuration also minimises the weight of the enclosure so that it may be easily transported and so that it may cause minimal strain to the turbine when suspended. This configuration provides the advantage of surrounding the circumference of a blade to be maintained without applying excess force against the blade. It also minimises the weight of the enclosure. This configuration provides the advantage of minimising the size of the enclosure when it is not deployed in order to straightforwardly store and transport the enclosure when not in use.

The seal may comprise an adjustable strap arranged around the circumference of the blade. The sheath may thus accommodate changes in the profile of the blade in need of maintenance.

The enclosure may comprise a number of side walls which substantially surround the circumference of a blade in need of maintenance.

The roof may comprise an aperture through which said blade is received. The enclosure may comprise a platform which is bounded by each of the side walls. The platform and side walls may thus support one another to provide an improved enclosure.

The platform may incorporate a barrier. The barrier may be collapsible.

In a second broad independent aspect, the invention provides a temporary maintenance enclosure for the maintenance of at least part of a turbine blade, said enclosure comprising a platform, a wall located on a first side of said enclosure and a roof; said first side being distal from said blade when the temporary maintenance enclosure is brought, in use, in close proximity to the side of a blade; wherein said enclosure comprises a removable side covering portion which when secured to said enclosure is located on a second side of said platform; said second side being proximal to said blade when the temporary maintenance enclosure is brought, in use, in close proximity to the side of a blade; wherein said side covering portion comprises a seal for sealing a volume about at least part of said blade for maintenance of said blade from within said enclosure.

This configuration provides the advantage of an enclosure where maintenance of a turbine blade can be carried out in poor weather conditions. This improves the safety of maintenance operations and allows time and cost efficient maintenance of a large number of turbine blades. The arrangement of the enclosure allows the covering portion to be wrapped around the circumference of a blade in need of maintenance.

The side covering portion may be collapsible independently from said wall and said roof. The side covering portion may thus be erected and dismantled independently of the side wall and roof.

The side covering portion may have an upper portion which surrounds the entire periphery of the blade.

The side covering portion may have a lower portion which projects sufficiently sideways to envelope the entirety of the blade. A worker may thus be able to reach the sides and rear surfaces of the blade whilst the blade is covered by the sheath.

The seal may be annular. The seal may be adjustable to accommodate changes in the profile of the blade.

The enclosure may be at least partially inflatable. This configuration provides the advantage of a maintenance structure, which is quick and straightforward to deploy. This way, maintenance/repair work can be swiftly carried out.

The platform may comprise an internal barrier extending across the width of the platform.

In a third broad independent aspect, the invention provides a method of maintaining a turbine blade, comprising the steps of:
a. providing a temporary maintenance enclosure of the kind defined in claim 9;
b. deploying said temporary maintenance enclosure to one side of said blade; and;
c. sealing a side covering portion onto said blade in order to provide a sealed volume for maintenance of said blade.

The method may comprise the step of removing the side covering portion.

The method may comprise the step of inflating an inflatable portion of the roof.

In a fourth broad independent aspect, the invention provides a temporary maintenance enclosure for the maintenance of at least part of a turbine blade, said enclosure comprising a platform arranged, in use, to border at least part of the circumference of a blade in need of maintenance; at least one wall and a roof which together are carried by said platform; said at least one wall extending from said platform; wherein said roof extends from said wall towards said blade; and wherein said enclosure further comprises a seal mechanism or seal for sealing onto said blade to provide a sealed volume for maintenance of said blade.

In a further broad independent aspect, the invention provides a temporary maintenance enclosure for the maintenance of at least part of a turbine blade, said enclosure comprising a number of side walls which substantially surround the circumference of a blade in need of maintenance; and a roof extending from said side walls towards said blade; wherein said roof comprises an aperture through which said blade is received.

This configuration provides the advantage of an enclosure where maintenance of a turbine blade can be carried out in poor weather conditions. This improves the safety of maintenance operations and allows time and cost efficient maintenance of a large number of turbine blades.

Preferably, said enclosure is at least partially inflatable. This configuration provides the advantage of a maintenance structure, which is quick and straightforward to deploy. This way, maintenance/repair work can be swiftly carried out.

This configuration also minimises the weight of the enclosure so that it may be easily transported and so that it may cause minimal strain to the turbine when suspended.

Preferably, said roof is inflatable. This configuration provides the advantage of surrounding the circumference of a blade to be maintained without applying excess force against the blade. It also minimises the weight of the enclosure.

Preferably, said side walls are collapsible. This configuration provides the advantage of minimising the size of the enclosure when it is not deployed in order to straightforwardly store and transport the enclosure when not in use.

Preferably, said roof incorporates an inflatable portion, a seal about said aperture and a flexible sheath extending from said aperture to said inflatable portion. This configuration prevents water from entering the enclosure, and therefore from damaging the blade during repair, when the enclosure is deployed about a turbine blade. It also allows the enclosure to move up and down the blade whilst preventing water entry, i.e. allowing the enclosure to move without requiring an operator to detach and reattach the enclosure to the blade whilst repair work takes place.

Preferably, said enclosure comprises a platform located inside said side walls. This configuration allows maintenance and repair work to be carried out straightforwardly when the enclosure is suspended above the ground.

Preferably, said enclosure is adapted to fit around a platform. This configuration allows the enclosure to be attached to a separate pre-existing platform, similar to those that are already used. This configuration also allows maintenance and repair work to be carried out straightforwardly when the enclosure is suspended above the ground.

Preferably, said seal incorporates a member defining said aperture. This configuration provides the advantage of effectively sealing to a turbine blade to prevent water entry whilst preventing damaging load from being applied to the blade.

Preferably, said member is inflatable. This configuration is particularly advantageous because the inflatable member reduces the risk of damage to the blade.

Preferably, said enclosure further comprises suspension means for suspending said enclosure in position relative to said blade. This configuration provides the advantage of being able to lift the enclosure to an above ground level position so that maintenance work can be carried out on a turbine blade. This configuration also allows the enclosure to be vertically moveable in order for it to be positioned optimally for maintenance work.

Preferably, said side walls and said roof comprise a plurality of inflatable compartments. This configuration provides the advantage of increasing the strength of the enclosure. It also improves the safety of the enclosure because, if a compartment becomes deflated, the overall integrity of the enclosure is maintained.

Preferably, said inflatable compartments have a tubular configuration. This configuration provides the advantage of further increasing the strength of the enclosure.

Preferably, said platform incorporates a barrier, and said barrier is collapsible. This configuration provides the advantage of minimising the size of the enclosure when not in use. When in use, the barrier reduces the risk of harm to operators as they are kept at a safe distance from the blade and, if present, from an aperture on the platform.

In a further broad independent aspect, the invention provides a method of maintaining a turbine blade, comprising the steps of:
providing a platform on which maintenance of a turbine blade can occur;

deploying a temporary maintenance enclosure which is adapted to fit around said platform; said enclosure comprising a number of side walls which substantially surround the circumference of a blade; and a roof extending from said side walls towards said blade; preferably Inflating an inflatable portion of said roof; and preferably securing a flexible sheath, which extends from the aperture in said roof, to said turbine blade.

This method provides the advantage of carrying out maintenance work on a turbine blade even where there are poor weather conditions. This method improves the safety of maintenance operations and allows time and cost efficient maintenance of a large number of turbine blades.

Preferably, said method comprises the step of raising said enclosure prior to securing said flexible sheath to said blade. This step provides the advantage of allowing the flexible sheath to be secured to a turbine blade prior to conducting maintenance work.

Preferably, said method comprises the step of lowering said enclosure subsequent to securing said flexible sheath to said blade. This step provides the advantage of positioning the enclosure at its' location of maintenance whilst the flexible sheath provides protection from water entry.

Preferably, said method comprises the step of at least partially inflating said enclosure. This step provides the advantage of minimising the weight of the enclosure so that strain on the turbine is minimised whilst the enclosure is suspended. It also minimises the overall size of the enclosure when it is not deployed so that it can be straightforwardly transported and stored.

DETAILED DESCRIPTION OF THE INVENTION

Figure 1:
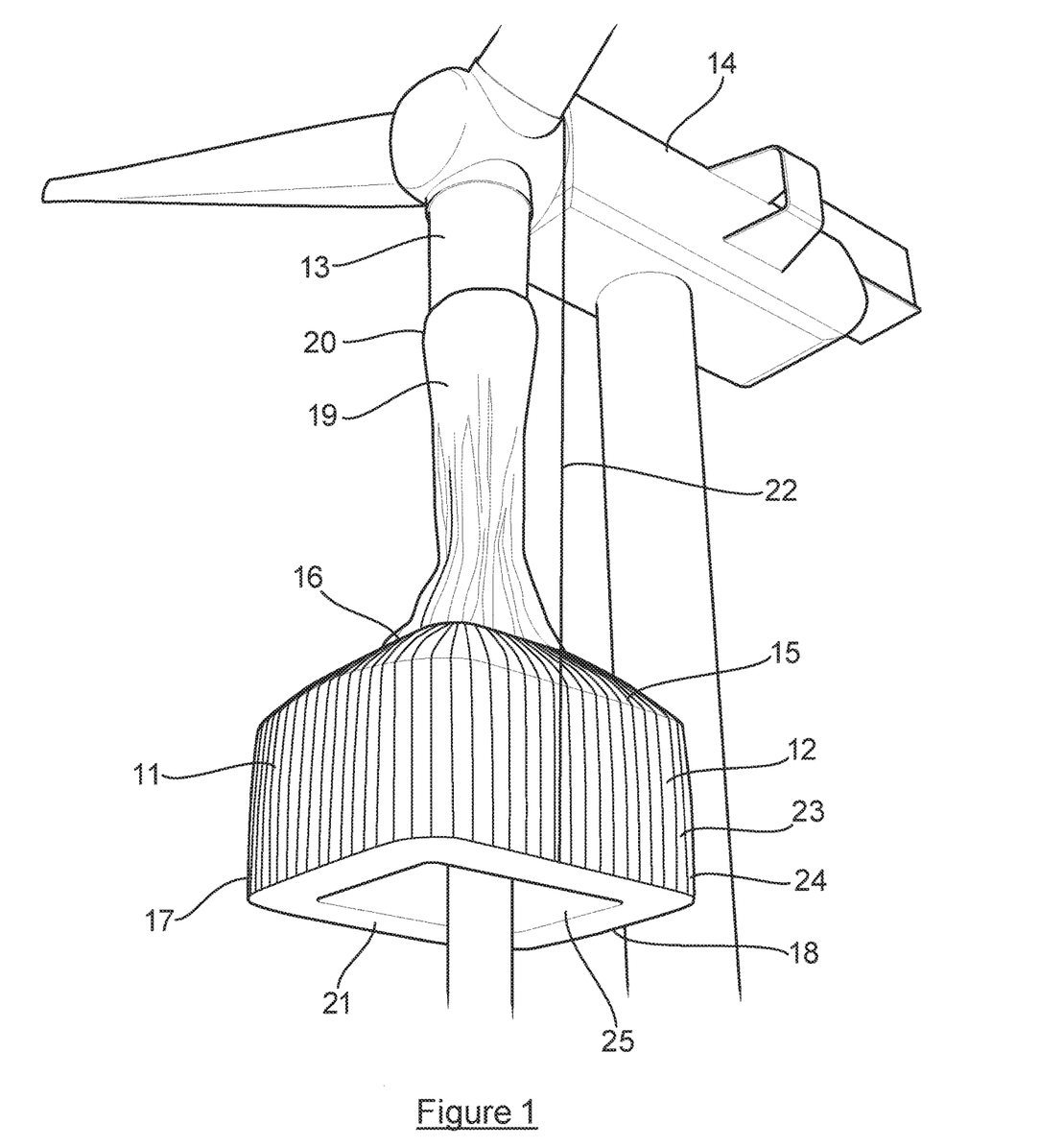
FIG. 1 shows a perspective view of an embodiment of the invention.

The temporary maintenance enclosure of the current invention is shown in FIG. 1, referenced generally as 10. Maintenance of the wind turbine 14 includes, but not exclusively: repairing, cleaning, inspecting, installing retrofit parts, painting of the turbine and the replacement of parts.

In a preferred embodiment of the invention, the temporary maintenance enclosure 10 comprises a number of side walls, such as 11, 12, 17 and 18. The side walls substantially surround the circumference of a blade 13 of a wind turbine 14. The enclosure 10 also comprises a roof 15 which extends from the side walls to the blade 13. The roof 15 comprises an aperture 16 through which, in use, the blade 13 is received.

In the preferred embodiment the enclosure comprises four side walls, 11, 12, 17 and 18, which form a square and/or rectangle configuration around the blade 13. However, any number of side walls could be used to the same effect.

In this preferred embodiment, the enclosure also comprises a platform 21, which is located within the side walls 11, 12, 17 and 18. The platform comprises four flanks, which are attached to the four side walls which form an aperture 25 so that the enclosure can receive the blade and move up and down the blade freely to conduct maintenance work.

In a preferred embodiment, the enclosure 10 is at least partially inflatable. This allows fast deployment of the enclosure as it can be straightforwardly transported to a desired location and swiftly inflated so it is suitable for use. This configuration also minimises the weight of the enclosure so that strain on the turbine is minimised.

Figure 2:
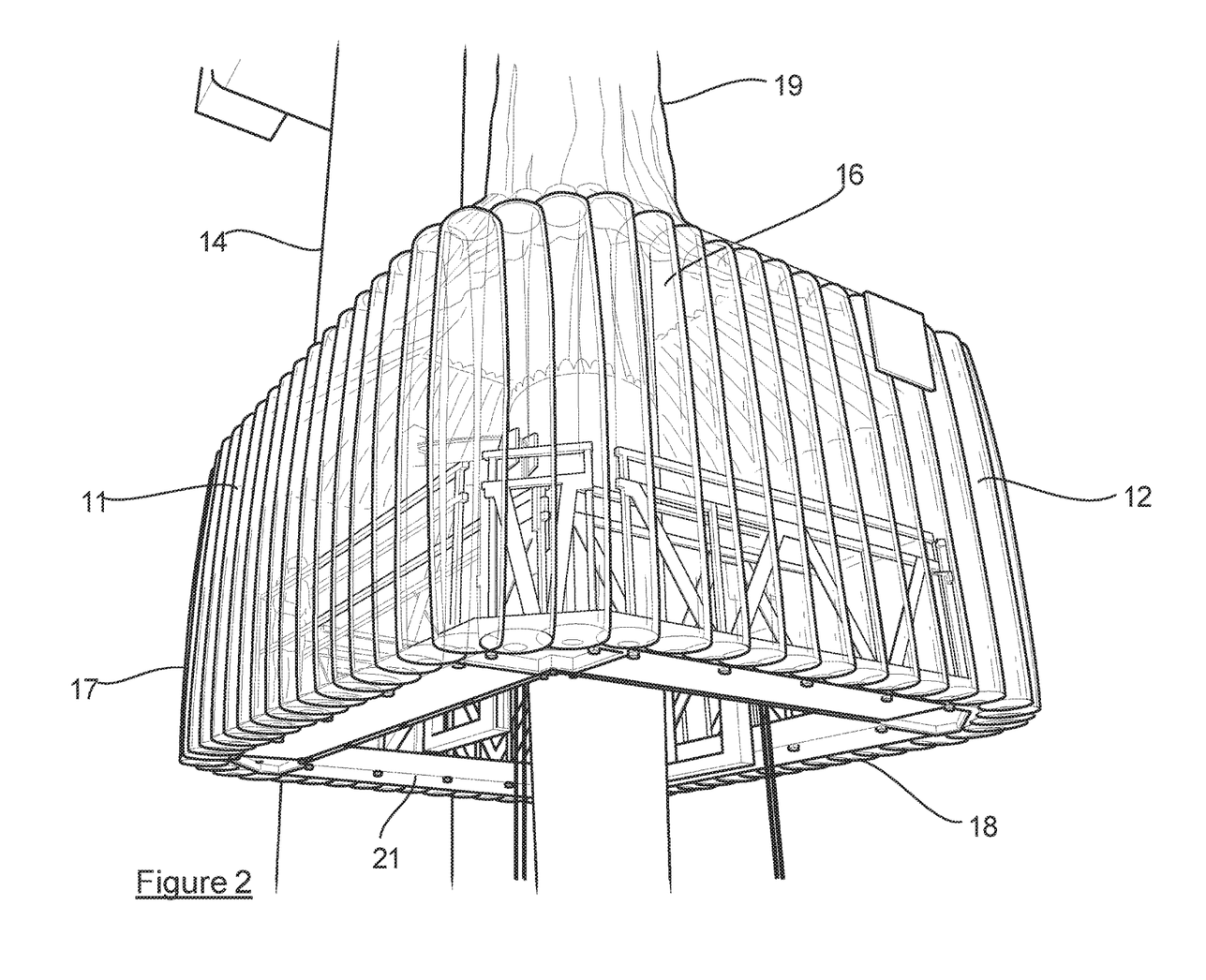
FIG. 2 shows another perspective view of an embodiment of the invention.

FIG. 2 shows another perspective view of the preferred embodiment of the enclosure. In this preferred embodiment, the platform 21 is bounded by each of the side walls, 11, 12, 17 and 18, which extend below and support the platform so that the platform is securely held as part of the enclosure. In this configuration the platform provides further strength to the enclosure and allows operators to effectively move around and maintain the blade.

In the preferred embodiment, the platform incorporates a barrier for minimising the risk of harm to operators. The barrier is located along the inner edge of each flank of the platform to prevent operators from falling through the aperture of the platform, between the platform and the blade. Preferably, the barrier is collapsible so that when it is not in use, the size of the enclosure is minimised. Alternatively, the barrier is removeably attached to the platform so that the barrier can be inserted/removed prior to and following inflation and deflation of the enclosure.

In the preferred embodiment of the invention, the platform consists of a non-inflatable robust material capable of holding the weight of operators and/or repair equipment. However, it is envisaged that the platform could consist of an inflatable material which is capable of holding the weight, which could therefore further minimise the size of the enclosure when not in use and minimise the strain applied to the turbine when the enclosure is deployed.

In an alternative embodiment the enclosure 10 is adapted to fit around a platform. This allows the enclosure to be used with existing platforms to provide them with the advantages already discussed.

In an alternative embodiment the roof 15 is inflatable. This provides a snug connection between the enclosure 10 and the blade 13 in order to minimise or preferably prevent the entry of water into the enclosure, thereby minimising the risk of damage to the blade or maintenance equipment. In this embodiment the side walls, such as 11 and 12, are collapsible in order to minimise the size of the enclosure 10 when not in use.

Preferably, the enclosure is comprised substantially of transparent and/or non-transparent plastics material, however it is envisaged that the enclosure could consist of any light and robust material which is preferably capable of being inflated.

In the preferred embodiment, the roof 15 incorporates an inflatable portion and a seal about the aperture 16. The roof 15 also incorporates a flexible sheath 19 which, extends from the aperture 16 of the roof onto the blade 13. The flexible sheath 19 consists of a waterproof material, preferably of flexible plastics material, which prevents water from entering the enclosure by surrounding the circumference of the blade 13. This allows the enclosure to move up and down a blade without the requirement for an operator to detach and reattach the enclosure as it moves. In an alternative embodiment the flexible sheath 19 further incorporates an inflatable portion, such as 20 which, in use, is inflated to form a watertight connection with the blade 13. In another alternative embodiment the flexible sheath 19 incorporates a non-inflatable seal which is tightened around the blade 13.

In the preferred embodiment, the sheath incorporates a seal at the aperture 16 of the enclosure or where the sheath 19 is attached to the blade 20. This provides the advantage of effectively sealing the enclosure 10 to the turbine blade 13 in order to prevent water entry, whilst preventing damaging load from being applied to the blade.

In the preferred embodiment, the enclosure further comprises suspension means 22 to suspend the enclosure 10 from the wind turbine 14 whilst maintenance work is conducted. In this embodiment the suspension means comprises a tether, which is attached to the wind turbine 14 and the enclosure 10 so that the enclosure can move in a vertical direction in relation to the turbine 14. This allows the enclosure 10, with its aperture 16 to surround the circumference of a blade 13 in order for maintenance work to be carried out.

In an alternative embodiment, the enclosure is raised by means of a ground level elevation system. This applies minimal strain on the turbine when maintenance is conducted on the blade. In another alternative embodiment, the enclosure further comprises a hydraulic system, positioned on the platform, for elevating and lowering the enclosure.

In the preferred embodiment, the side walls and roof comprises a number of inflatable compartments, such as 23 and 24, which have a tubular arrangement. The tubular configuration of the compartments increases the strength of the enclosure 10 so that it is more resistant against poor weather conditions such as heavy wind and rain. The tubular configuration also assists in maintaining the overall shape of the enclosure when inflated and when deflated.

In an alternative embodiment, the roof 15 of the enclosure 10 incorporates an inflatable seal which is located at the aperture, rather than a flexible sheath, to provide a water tight connection with the blade.

In use, in the preferred embodiment of the invention, the enclosure 10 can be straightforwardly stored and then transported to a turbine in need of maintenance when required. Once at the turbine the enclosure 10 can be deployed. This may involve attaching the enclosure to a separate pre-existing platform or, preferably, deploying an enclosure which has an integral platform. Once deployed, the enclosure can be attached to the turbine via the suspension means and hoisted to a required position whereby the enclosure surrounds a section of a blade of a turbine.

Prior to being positioned at the maintenance position, the enclosure may be raised above the maintenance position in order to attach the flexible sheath to the blade. Following this the enclosure can be subsequently lowered to the required maintenance position. The flexible sheath is preferably attached to the blade via a belt-style connection, which allows the sheath to be tightened around the blade in a controlled manner so that the blade is not damaged.

Once maintenance of the blade has been completed the enclosure can be lowered towards the ground. Prior to this, the enclosure is raised again to the height of the top of the flexible sheath in order to detach the sheath from the blade. However, in an alternative embodiment, means are present for remotely detaching the sheath from the blade.

Once the enclosure has been lowered to ground level, the suspension means can be detached from the turbine and the enclosure can be deflated or collapsed. If the platform incorporates a barrier, this can also be collapsed in order to minimise the size of the enclosure when not in use. If the enclosure has been attached to a separate platform, this can be detached before the enclosure is removed.

Figure 3:
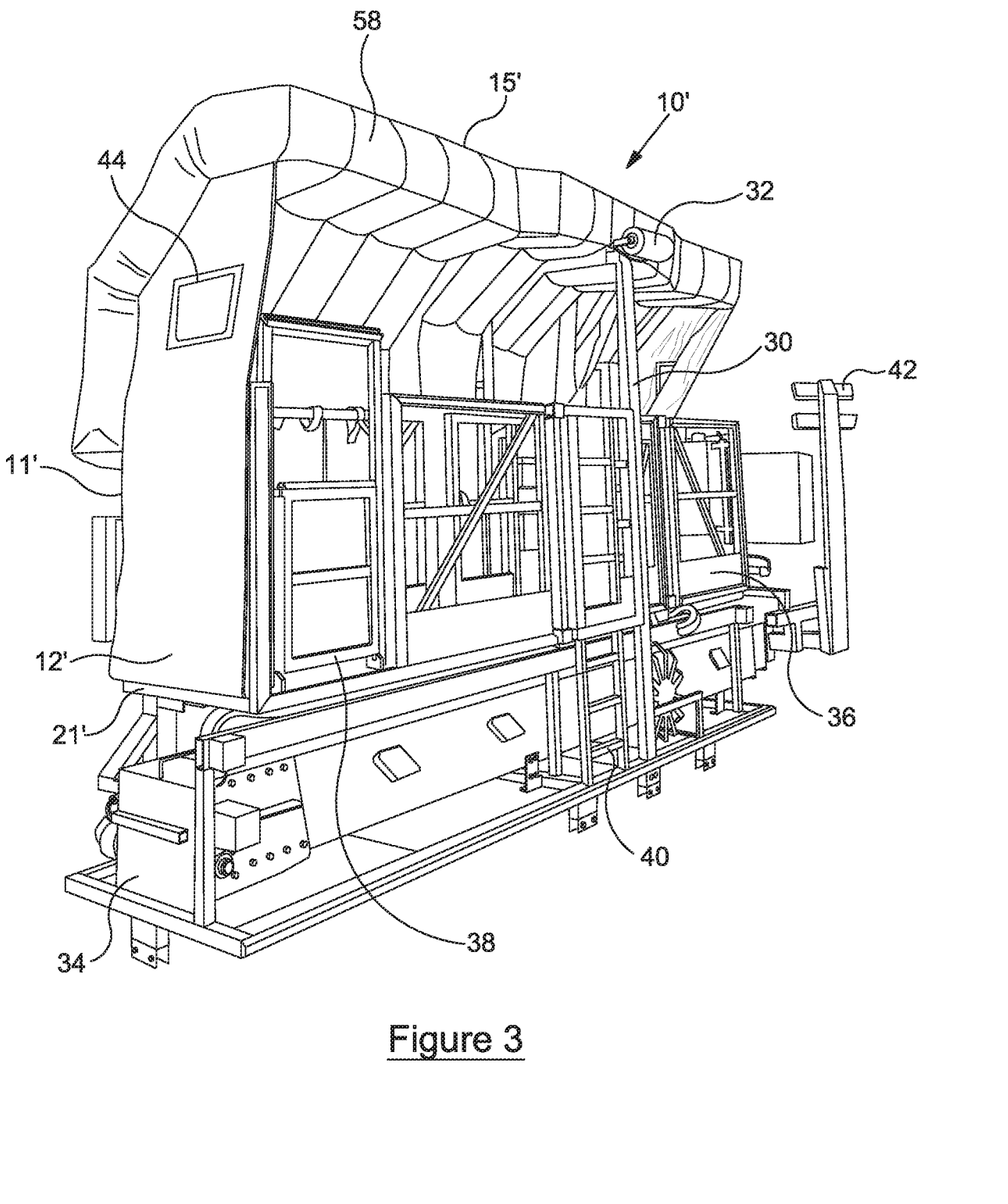
FIG. 3 shows a perspective view of a second embodiment of the temporary maintenance enclosure of the invention.

Turning to FIG. 3, an enclosure 10' comprises a platform 21' which is bounded by wall 11' at a first side and wall 12' at a further side. The platform 21' is arranged to border a side of a blade in need of maintenance (shown in FIGS. 4 and 5). The first side of the platform is distal from the blade when the enclosure and blade are brought into close proximity. A roof 15' extends from wall 11' towards the blade. The platform 21' is bounded by the walls, i.e. it is limited by and bordered by the walls to form an enclosure.

The walls 11', 12' are formed of a flexible material, such as a flexible plastics material, and are thus collapsible. Wall 12' comprises a window 44.

The roof 15' is inflatable. The roof 15' extends substantially midway down the height of wall 12'. The roof 15' comprises a series of substantially tubular compartments 58 which are arranged next to one another width wise. Adjacent compartments of the roof are in fluid communication with one another.

The platform 21' comprises a spine 30 which is located substantially centrally along the length of the platform 21' and extends upwardly towards the roof 15'. A bumper 32 is located towards a top end of the spine 30 and is arranged to contact the side of the blade which the enclosure 10' borders, in use, to separate the remainder of the platform 21' from the blade.

A barrier 36 extends upwardly from the platform 21' towards the roof 15' to around chest or waist height. A gate 38 facilitates travel between the two sides of the barrier 36. A ladder 40 allows movement from ground level into the enclosure 10' prior to use, and vice versa after use. The gate 38 is connected to the platform by a hinge so that it acts as a hinged platform. In other words, the gate 38 can be lowered to act as a platform allowing access to the side and rear of a blade.

The platform 21' comprises a joist 34 which spans substantially the entire length of the platform 21' and which is located below the enclosure formed by the platform 21', walls 11', 12' and roof 15'.

The enclosure 10' further comprises a rig 42 for housing, for example, control equipment or lighting equipment for illuminating the section of a blade to be repaired.

Figure 4:
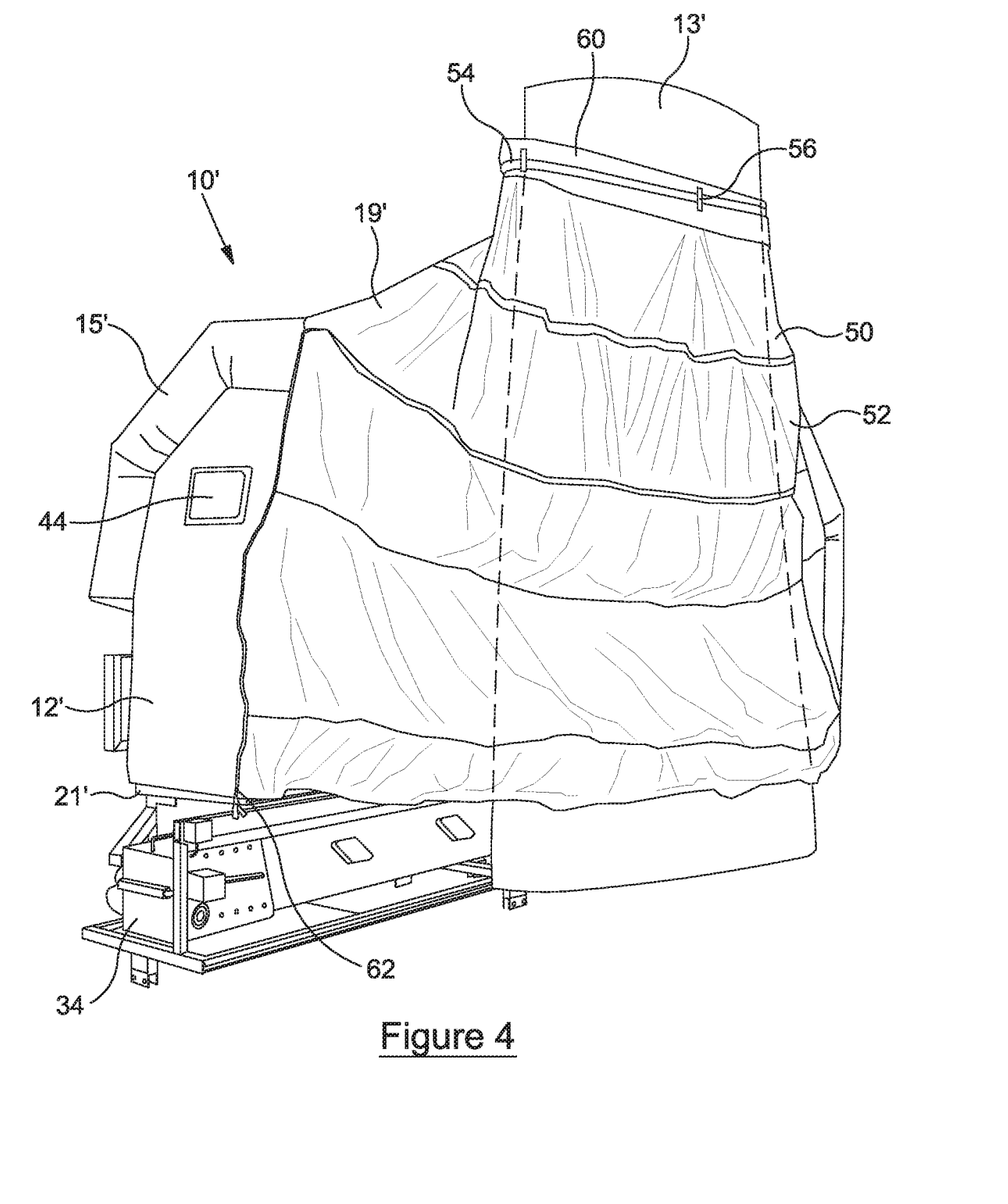
FIG. 4 shows a front three quarter view of the enclosure of FIG. 3.

Referring to FIG. 4, the enclosure 10' further comprises a covering portion arranged as a flexible sheath 19' which is removable from the enclosure 10'. When secured, as shown in FIG. 4, the covering portion is located on a second side of the platform 21' which is proximal to the blade when the blade and enclosure 10' are in close proximity. The flexible sheath 19' surrounds the circumference of the part of a blade 13' to be repaired. The sheath 19' is thus of a size which is suitable for shrouding the circumference of the blade at all diameters between the base and tip of the blade. The sheath 19' is comprised of several sections, such as 50 and 52, which are connected to one another.

The covering portion further comprises a seal 54 for sealing a volume about part of the blade. The seal comprises a strap which is adjustable so that the covering portion, i.e. the sheath, can form a water-tight seal around the blade at different parts of the blade, between the base and tip of the blade.

A plurality of loops 56 are located towards the top of the sheath 19'. The loops 56 are arranged to receive the seal 54 so that the seal is correctly positioned. The sheath 19' comprises a band 60 located towards the top end of the sheath 19' over which the seal 54 is positioned in use. The band 60 improves friction engagement between the seal 54 and the sheath 19'.

The side covering portion is collapsible independently from the walls and roof of the enclosure 10'. An upper portion of the covering portion surrounds the entire periphery of the blade and a lower portion projects sufficiently sideways to envelope the entirety of the blade.

The seal 54 is annular and adjustable to accommodate changes in the profile of the blade.

The enclosure 10' further comprises a connecting member 62, arranged as a zip in the embodiment of FIG. 4, to connect the sheath 19' to the wall and roof of the enclosure 10'. The connecting member provides a water-tight seal between the side covering portion and the rest of the enclosure 10'

Figure 5:
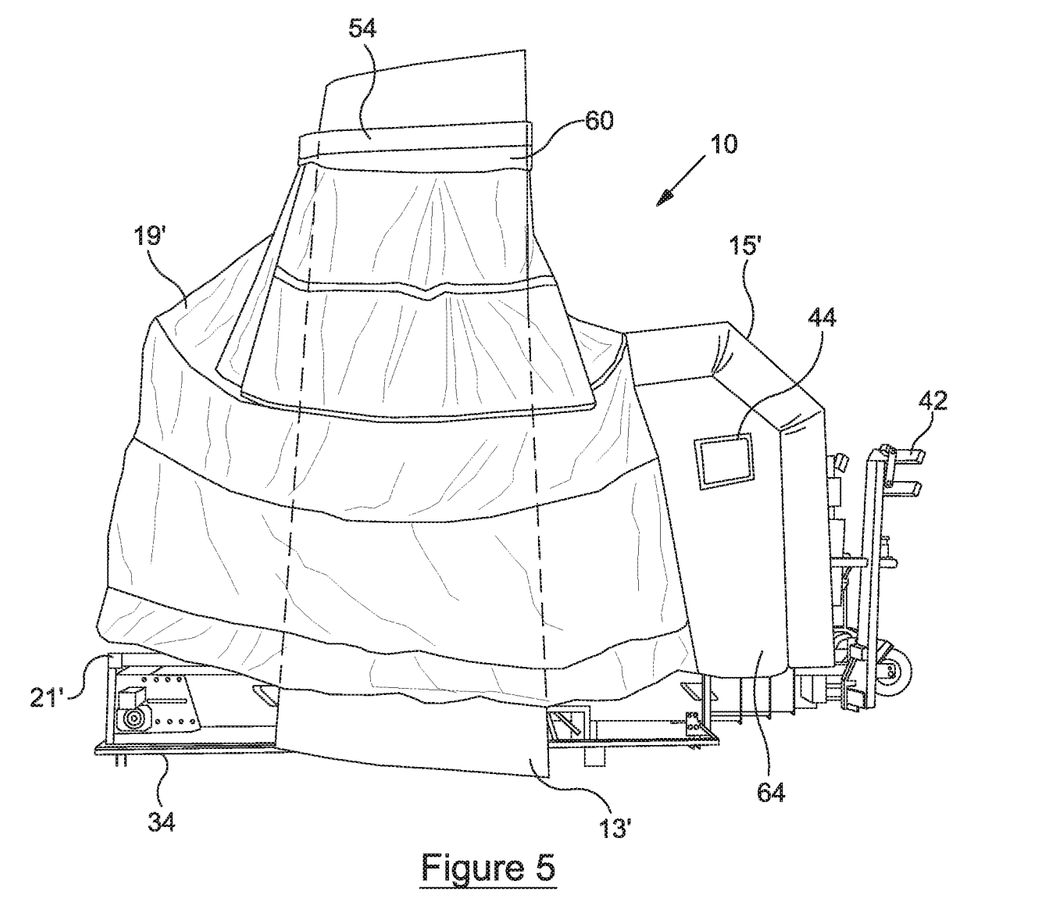
FIG. 5 shows a view of the front of the enclosure of FIG. 3.

Referring to FIG. 5, a portion of the roof is not surrounded by the sheath 19'. The enclosure 10' further comprises a front wall 64 which, together with a side wall and wall 11' forms an area of the enclosure 10' which is not covered by the covering portion 19'. The front wall 64 comprises a window 44.

As shown by the dashed lines in FIG. 5, the blade in need of maintenance is surrounded by the covering portion 19' at a section of the blade between the tip and base. The platform 21' abuts the side of the blade which requires attention. The seal 54 provides a water-tight seal between the sheath 19' and the blade so that maintenance of the blade can be carried out in a controlled environment.

The invention claimed is:

1. A temporary maintenance enclosure for the maintenance of at least part of a turbine blade, said enclosure comprising a platform arranged, in use, to border at least part of the circumference of a blade in need of maintenance; at least one wall and a roof which together are carried by said platform; said at least one wall extending from said platform; wherein said roof extends from said wall towards said blade; and wherein said enclosure further comprises a flexible sheath which seals onto said blade to provide a sealed volume for maintenance of said blade.

2. A temporary maintenance enclosure in accordance with claim 1, wherein said enclosure is at least partially inflatable.

3. A temporary maintenance enclosure in accordance with claim 1, wherein said roof is inflatable.

4. A temporary maintenance enclosure in accordance with claim 1, wherein said wall is collapsible.

5. A temporary maintenance enclosure in accordance with claim 1, wherein said flexible sheath comprises an adjustable strap arranged around the circumference of the blade.

6. A temporary maintenance enclosure in accordance with claim 1, comprising a number of side walls which substantially surround the circumference of a blade in need of maintenance.

7. A temporary maintenance enclosure in accordance with claim 1, wherein said roof comprises an aperture through which said blade is received; and wherein said enclosure comprises a platform which is bounded by each of said side walls.

8. A temporary maintenance enclosure according to claim 1, wherein said platform incorporates a barrier, and said barrier is collapsible.

9. A temporary maintenance enclosure for the maintenance of at least part of a turbine blade, said enclosure comprising a platform, a wall located on a first side of said enclosure and a roof; said first side being distal from said blade when the temporary maintenance enclosure is brought, in use, in close proximity to the side of a blade; wherein said enclosure comprises a removable side covering portion which when secured to said enclosure is located on a second side of said platform; said second side being proximal to said blade when the temporary maintenance enclosure is brought, in use, in close proximity to the side of a blade; wherein said side covering portion comprises a seal for sealing a volume about at least part of said blade for maintenance of said blade from within said enclosure.

10. A temporary maintenance enclosure in accordance with claim 9, wherein said side covering portion is collapsible independently from said wall and said roof.

11. A temporary maintenance enclosure in accordance with claim 9, wherein said side covering portion has an upper portion which surrounds the entire periphery of a blade.

12. A temporary maintenance enclosure in accordance with claim 9, wherein said side covering portion has a lower portion which projects sufficiently sideways to envelope the entirety of a blade.

13. A temporary maintenance enclosure in accordance with claim 9, wherein said seal is annular and is adjustable to accommodate changes in the profile of a blade.

14. A temporary maintenance enclosure in accordance with claim 9, wherein said enclosure is at least partially inflatable.

15. A temporary maintenance enclosure in accordance with claim 9, wherein said platform comprises an internal barrier extending across the width of said platform.

16. A method of maintaining a turbine blade, comprising the steps of:
   a. providing a temporary maintenance enclosure of the kind defined in claim 9;
   b. deploying said temporary maintenance enclosure to one side of said blade; and
   c. sealing a side covering portion onto said blade in order to provide a sealed volume for maintenance of said blade.

17. A method according to claim 16, comprising the step of removing said side covering portion.

18. A method according to claim 16, comprising the step of inflating an inflatable portion of said roof.

* * * * *